United States Patent
Centineo

[11] 3,936,376
[45] Feb. 3, 1976

[54] METHOD FOR COLLECTING SCALE FORMATIONS IN WATER PIPES

[75] Inventor: Philip Centineo, Camarillo, Calif.
[73] Assignee: Key II Industries, Camarillo, Calif.
[22] Filed: Apr. 9, 1975
[21] Appl. No.: 566,266

Related U.S. Application Data
[63] Continuation of Ser. No. 472,545, May 23, 1974, abandoned.

[52] U.S. Cl. ............... 210/42 S; 204/302; 210/222; 210/243
[51] Int. Cl.² ..................... B03C 5/00; B01D 35/06
[58] Field of Search ............ 210/222, 223, 243, 42, 210/65; 204/302; 317/2

[56] References Cited
UNITED STATES PATENTS
| | | | |
|---|---|---|---|
| 1,831,075 | 11/1931 | Neeley | 210/243 X |
| 3,398,082 | 8/1968 | Lochmann et al. | 210/223 X |
| 3,511,776 | 5/1970 | Aramparo | 210/222 X |
| 3,680,705 | 8/1972 | Happ et al. | 210/222 |
| 3,703,958 | 11/1972 | Kolm | 210/65 |
| 3,788,473 | 1/1974 | King | 210/243 |

FOREIGN PATENTS OR APPLICATIONS
| | | | |
|---|---|---|---|
| 134,457 | 10/1946 | Australia | 210/222 |
| 143,731 | 11/1961 | U.S.S.R. | 210/243 |

Primary Examiner—Theodore A. Granger
Attorney, Agent, or Firm—Ralph B. Pastoriza

[57] ABSTRACT

Conglomerations of charged ions of minerals in a water pipe system resulting from subjecting the water to an alternating electric field are effectively removed from the water flow path by providing first and second screens. The first screen is located normal to the flow path so that the water flows through the screen. The second screen is located in a chamber connected laterally to a water pipe section carrying the water flow upstream of the first screen. The first and second screens are charged positively and negatively respectively so that the first screen will repel conglomerations of minerals and the second screen will attract the same to collect them in the chamber.

1 Claim, 2 Drawing Figures

METHOD FOR COLLECTING SCALE FORMATIONS IN WATER PIPES

This application is a continuation of Ser. No. 472,545, filed May 23, 1974, now abandoned.

This invention relates to water purification methods and more particularly to an improved method for removing conglomerations of minerals entrained in water passing through pipes resulting from a previous subjecting of the water to an alternating electric field.

BACKGROUND OF THE INVENTION

In co-pending patent application Ser. No. 310,240 filed Nov. 29, 1972 and entitled SCALE INHIBITING APPARATUS, said co-pending application now Pat. No. 3,843,507 being assigned to the same assignee as the present invention, there is shown and described an improved arrangement of electrodes in a pipe section in combination with a square wave voltage generator providing alternate polarity charges on the electrodes and pipe section itself. Charged ions of minerals in the water are thereby inhibited from adhering to the inner walls of water pipes so that the build up of scale is inhibited.

The foregoing arrangement has been extremely efficient and worked well. However, it is desirable to further treat the water by removing conglomerations of charged ions of minerals entrained in the water flow.

BRIEF DESCRIPTION OF THE PRESENT INVENTION

With the foregoing in mind, the present invention contemplates a method including the collection of positively charged conglomerations of minerals entrained in water and resulting from a previous subjection of the water to an alternating electric field.

More particularly, the method contemplates the provision of a pipe section having a first screen adjacent steps of subjecting flowing water to an alternating square wave electric field to cause conglomerations of charged ions to be entrained in said flowing water; thereafter confining the flowing water to a horizontal flow path; positioning a first screen in a vertical plane in the flow path; providing a chamber below the flow path in communication with the flow path at a point before the flowing water reaches the screen; providing a second screen in an horizontal plane in the chamber; charging the first screen with an electrically positive charge; and charging the second screen with an electrically negative charge. As a result, the conglomerations are repelled by the first screen and attracted to the second screen to be collected in the chamber.

BRIEF DESCRIPTION OF THE DRAWINGS

A better understanding of the invention will be had by now referring to a preferred embodiment thereof as shown in the accompanying drawings in which.

DETAILED DESCRIPTION OF THE INVENTION

Figure 1:
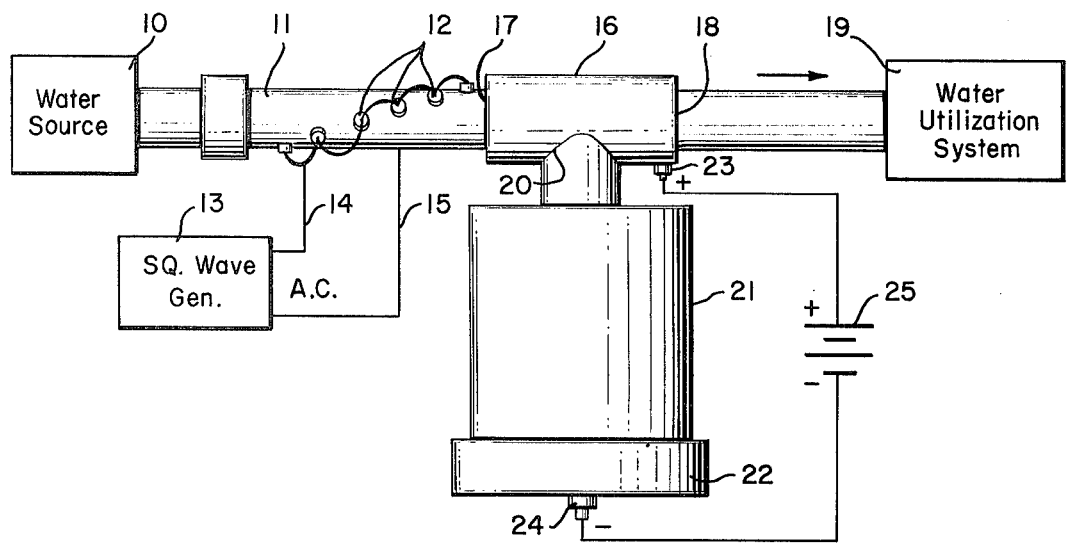
FIG. 1 is a side elevational view of an example of apparatus in combination with a scale inhibiting device disposed between a water source and a water utilization system for carrying out the method; and, FIG. 2 is an enlarged cross section of the collecting apparatus portion of the overall combination of FIG. 1.

Referring first to FIG. 1 there is shown a water source or supply designated generally by the block 10 wherein water therefrom is initially treated by a scale inhibiting device 11. This device is of the type described and claimed in the heretofore referred-to co-pending application and includes individual probes 12 which extend radially into the pipe 11 following a helical path in an axial direction. The probes are insulatively supported by the pipe section and these probes and the pipe sections themselves are subjected to an alternating square wave voltage from a square wave generator 13 as by way of leads 14 and 15.

With the foregoing arrangement, the water flow in the pipe 11 is subjected to an alternating electric field resulting in scale formation from conglomerations resulting from charged ions of minerals, the same being entrained in the water flow.

In accord with the present invention, a collecting apparatus includes a pipe section 16 having inlet and outlet ends 17 and 18 for connection respectively to the outlet of the scale inhibiting device 11 and a water utilization system designated generally by the block 19.

Intermediate the inlet and outlet ends 17 and 18 of the pipe section 16, there is provided a lower opening 20 in communication with a closed chamber 21. The bottom of this chamber may include a removable base as indicated at 22.

As will become clearer as the description proceeds, there are provided first and second screens respectively at the outlet end 18 of the pipe section 16 and within the chamber 21 which are subjected to a DC voltage. Towards this end, there are provided screen terminals 23 and 24 leading from the outlet end of the pipe section and the bottom base of the chamber for connection to a DC source as indicated schematically by the battery 25.

Figure 2:
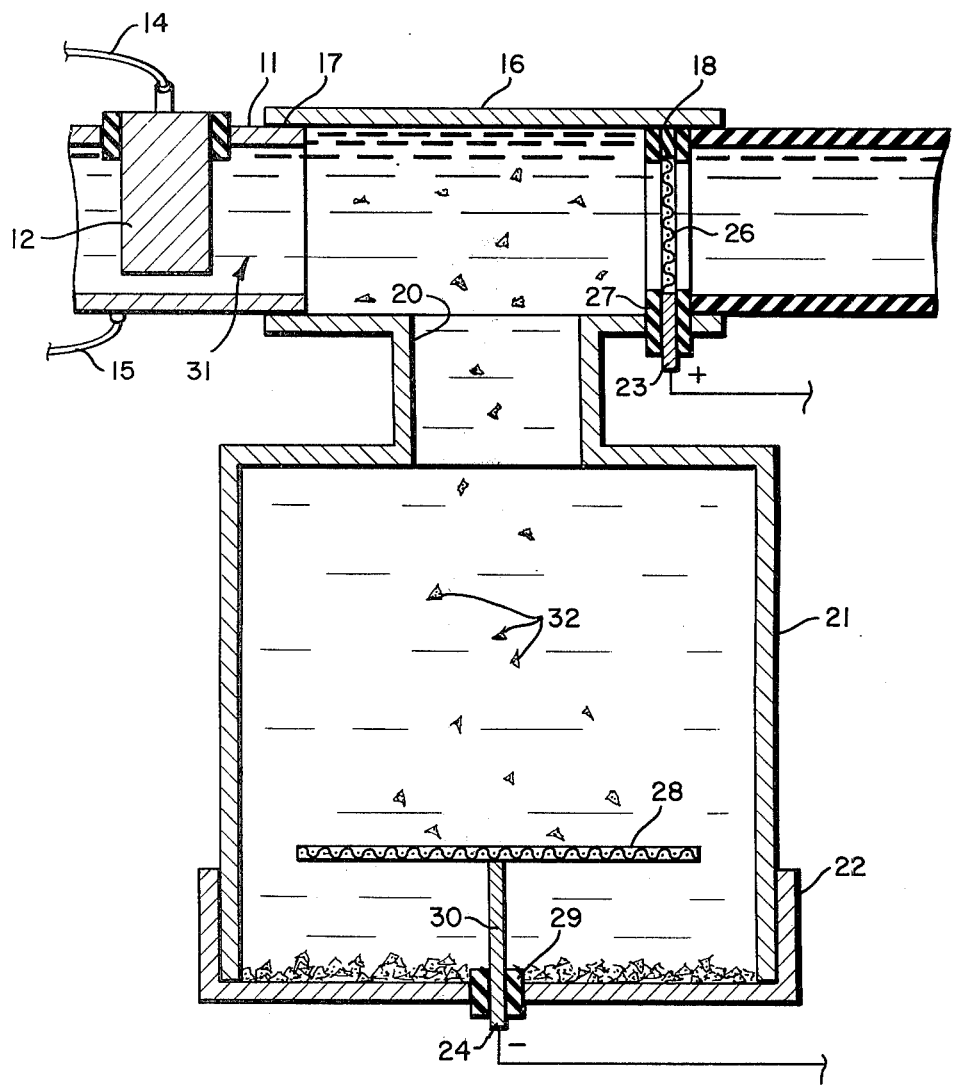

The foregoing will become clearer by now referring to FIG. 2 constituting an enlarged cross section of the pipe section and chamber of FIG. 1.

In FIG. 2, a portion of the scale inhibiting device 11 is shown wherein the configuration of one of the electrodes 12 is shown. The flow path of water is from left to right through the pipe section 16 as viewed in FIG. 2. The first screen referred to in respect to FIG. 1 is shown at 26 extending normal to the flow path at the outlet end 18 of the pipe section 16. It will be noted that the screen 26 is insulatively supported with respect to the pipe section so that a positive charge placed thereon through the screen terminal 23 will not be grounded.

The second screen within the chamber 21 is shown at 28 spaced from the bottom or base member 22. In the embodiment disclosed, the terminal 24 is insulatively supported as at 29 to the base and extends upwardly in the form of a conductive rod 30 supporting the screen 28.

As indicated by the positive and negative signs, the first screen 26 is charged positively and the second screen 28 is charged negatively. The DC voltage source may constitute for example, a six-volt supply.

OPERATION

In operation, assume that water from the water source 10 is flowing through the pipe section as indicated at 31 to a water utilization system. As a consequence of subjection of the water to the alternating square wave voltage field in the scale inhibiting device 11 as described in FIG. 1, charged ions of minerals will form conglomerations entrained within the water flow. These conglomerations which might include calcium ions, for example, are positively charged. Some of the conglomerations are indicated in exaggerated size at 32.

As the water flow progresses through the screen 26 because of the positive charge on this screen, the conglomerations will be repelled and tend to drift downwardly towards the chamber 21. The separating action is enhanced as a result of the negative charge on the screen 28 within the chamber 21 which attracts these conglomerations.

As illustrated in FIG. 2, the various conglomerations will collect on the bottom of the chamber and may be periodically removed by removing the base member 22.

By the method of this invention, water utilized in the water utilization system is free of those impurities which cause scale build up on the inside of pipes and boilers and the like.

What is claimed is:

1. A method of inhibiting scale in flowing water and collecting the same comprising, in combination, the steps of:

a. subjecting said flowing water to an alternating square wave electric field to cause conglomerations of charged ions to be entrained in said flowing water;

b. thereafter confining the flowing water to a horizontal flow path;

c. positioning a first screen in a vertical plane in said flow path;

d. providing a chamber below said flow path in communication with said flow path at a point before the flowing water reaches said screen;

e. providing a second screen in an horizontal plane in said chamber;

f. charging said first screen with an electrically positive charge so that said conglomerations are repelled by said first screen and thus tend to drift downwardly into said chamber; and, g. charging said second screen with an electrically negative charge to thereby attract said conglomerations for collection in said chamber.

* * * * *